(12) United States Patent
Sowa et al.

(10) Patent No.: US 7,256,918 B2
(45) Date of Patent: Aug. 14, 2007

(54) OPTICAL SCANNING DEVICE AND IMAGE FORMING APPARATUS INCORPORATING THE SAME

(75) Inventors: Takeshi Sowa, Nagano (JP); Nozomu Inoue, Nagano (JP); Yoichi Mitsui, Nagano (JP)

(73) Assignee: Seiko Epson Coporation, Tokyo (JP)

( * ) Notice: Subject to any disclaimer, the term of this patent is extended or adjusted under 35 U.S.C. 154(b) by 133 days.

(21) Appl. No.: 11/102,551

(22) Filed: Apr. 8, 2005

(65) Prior Publication Data

US 2005/0231779 A1 Oct. 20, 2005

(30) Foreign Application Priority Data

Apr. 9, 2004 (JP) ............ P2004-115237
Apr. 9, 2004 (JP) ............ P2004-115238

(51) Int. Cl.
*G02B 26/08* (2006.01)
(52) U.S. Cl. ...................... 359/216; 347/261
(58) Field of Classification Search ........... 359/216; 347/261
See application file for complete search history.

(56) References Cited

U.S. PATENT DOCUMENTS 4,796,961 A 1/1989 Yamada et al.
5,196,697 A * 3/1993 Arimoto et al. ............ 359/254
2002/0060829 A1 5/2002 Ueda

FOREIGN PATENT DOCUMENTS

| DE | 40 41 872 | 12/1990 |
|---|---|---|
| JP | 06-059210 | 3/1994 |
| JP | 2004-054116 | 2/2004 |

* cited by examiner

*Primary Examiner*—Euncha P. Cherry
(74) *Attorney, Agent, or Firm*—Hogan & Hartson LLP

(57) ABSTRACT

In order to determine an arrangement of an optical scanning device provided with a rotary polygon mirror having a plurality of reflective faces, it is determined a direction of polarization of light which is to be made incident on one of the reflective faces and to be reflected and deflected in accordance with a rotary action of the polygon mirror; and it is determined a direction from which the light is made incident on the one of the reflective faces, such that a variation of reflectivity of the light depending on a variation of an incident angle thereof in accordance with the rotary action of the polygon mirror compensate for a positional variation of reflectivity on the one of the reflective faces.

8 Claims, 5 Drawing Sheets

OPTICAL SCANNING DEVICE AND IMAGE FORMING APPARATUS INCORPORATING THE SAME

BACKGROUND OF THE INVENTION

This invention relates to an optical scanning device provided with a rotary polygon mirror, and to an image forming apparatus incorporating such an optical scanning device.

In using an optical scanning device having a rotary polygon mirror, dust in air collides against the reflective faces of the rotary polygon mirror and sticks to the reflective faces to become dirt as service time increases. The dirt deteriorates a reflectivity at the reflective faces, which decreases optical power at an optical beam spot on a scanned face. In this phenomenon, the dirt formed on each reflective face is not uniform, so that an optical power distribution on the scanned face in a primary scanning direction also does not become uniform. When an electrophotography laser printer equipped with such an optical scanning device is used continuously, the non-uniformity of density or color of images, caused by the non-uniformity of optical power distribution, will result.

Conventionally, the rotary polygon mirror is enclosed in an airtight environment to prevent such non-uniformity of optical power distribution due to the dirt on the reflective faces of the rotary polygon mirror. This method, however, is not effective enough to completely prevent the dirtying of the reflective faces, thus the non-uniformity of density or color of images cannot be avoided when the optical scanning device is operated for a longer period.

SUMMARY OF THE INVENTION

It is therefore an object of the invention to provide an optical scanning device hardly causes non-uniformity of optical power of a beam spot formed on a scanned face even if reflective faces of a rotary polygon mirror are dirtied.

It is also an object of the invention to provide an image forming apparatus incorporating such an optical scanning device.

In order to achieve the above objects, according to the invention, there is provided a method of determining an arrangement of an optical scanning device provided with a rotary polygon mirror having a plurality of reflective faces, the method comprising steps of:

determining a direction of polarization of light which is to be made incident on one of the reflective faces and to be reflected and deflected in accordance with a rotary action of the polygon mirror; and determining a direction from which the light is made incident on the one of the reflective faces, such that a variation of reflectivity of the light depending on a variation of an incident angle thereof in accordance with the rotary action of the polygon mirror compensate for a positional variation of reflectivity on the one of the reflective faces.

With the above configuration, the non-uniformity of density or color of images due to the non-uniformity of optical power distribution hardly occurs as the service time of the scanning device increases.

According to the invention, there is also provided an optical scanning device, comprising:

a photo emitter, which emits light; and a rotary polygon mirror having a plurality of reflective faces, and adapted to reflect the light incident on one of the reflective faces while deflecting the reflected light in a first direction in accordance with a rotary action thereof, wherein the photo emitter and the rotary polygon mirror are arranged such that S-polarized light is made incident on the one of the reflective faces from a downstream side of the first direction.

According to the invention, there is also provided an optical scanning device, comprising:

a photo emitter, which emits light; and a rotary polygon mirror having a plurality of reflective faces, and adapted to reflect the light incident on one of the reflective faces while deflecting the reflected light in a first direction in accordance with a rotary action thereof, wherein the photo emitter and the rotary polygon mirror are arranged such that P-polarized light is made incident on the one of the reflective faces from an upstream side of the first direction.

According to the invention, there is also provided an image forming apparatus incorporating any one of the above optical scanning devices, and comprising:

a photosensitive member, adapted such that a latent image is formed thereon by being scanned with the light deflected by the optical scanning device; and a developing device, which applies developer on the photosensitive member to make the latent image visible.

Here, it is preferable that the optical scanning device is arranged below the developing device.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

The essential feature of an optical scanning device of the invention is to select a polarization of light from a light source and an incident direction of the light relative to each reflective face of the rotary polygon mirror. The selection is made so that the incident angle dependency of a reflectivity at each reflective face of the rotary polygon mirror and the position dependency of the reflectivity due to dirt on the reflective face compensate for each other.

Figure 5:
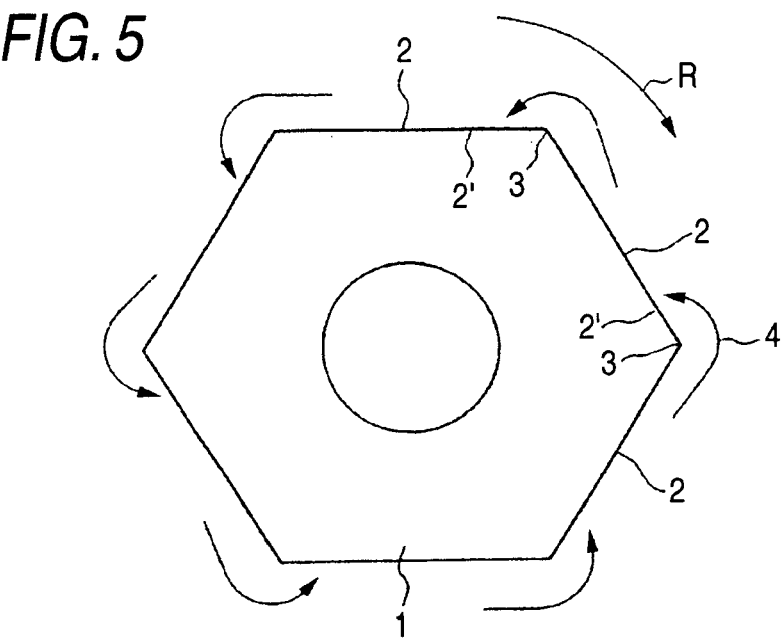
FIG. 5 is a diagram for explaining how reflective faces of a rotary polygon mirror is dirtied.

When a rotary polygon mirror 1 rotates in the direction of an arrow R shown in FIG. 5, air around the mirror 1 flows relatively in reverse to the direction of the rotation of each reflective face 2 to become an airflow 4. This airflow forms a turbulent flow downstream to an edge 3, which is the boundary between adjacent reflective faces 2. The turbulent flow engulfs dust in the airflow 4, and collides against each reflective face 2. As a result, the part of each reflective face 2 that is the downstream side (the leading end side of the reflective face 2 in the rotation direction) 2' to the boundary edge 3 dirties in a concentrated manner. The dirtying of the downstream side 2' to the boundary edge 3 means the dirtying of a position that is the upstream side of deflection, that is, of the position corresponding to the initiation side of a scan of a light beam in a primary scanning direction. Hence the dirt causes a decrease in optical power at an optical beam spot on a scanned face at the scan initiation side, during continuous service of a laser printer in which the rotary polygon mirror 1 is incorporated.

Figure 6:
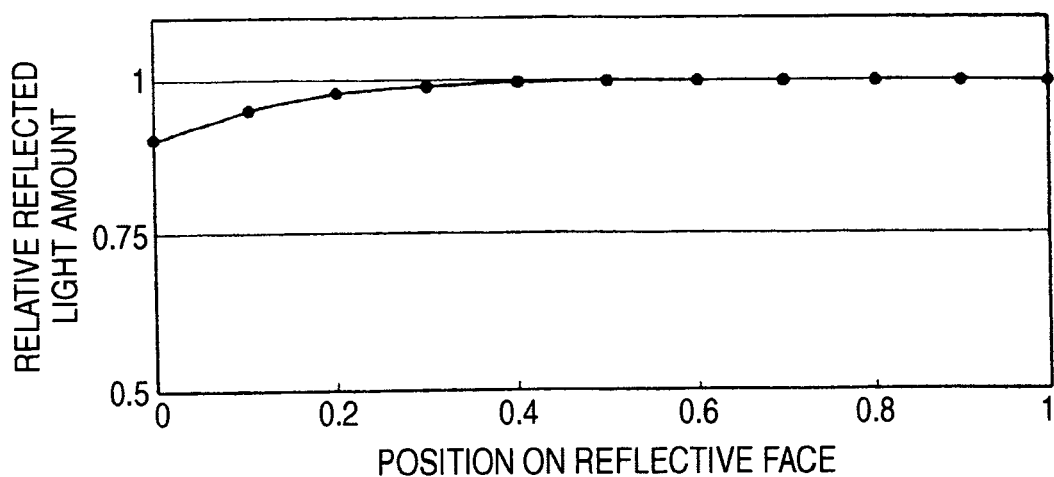
FIG. 6 is a graph for explaining decrease of a relative reflected light amount at a part of a reflective face of the polygon mirror of FIG. 5 when the reflective face is dirtied.

FIG. 6 is a graph that depicts a decrease in reflected light amount, which depends on a position on a reflective face, due to the dirt on each reflective face 2 of the rotary polygon mirror 1 operated for a certain time. The position on the reflective face is represented by the axis of the ordinate, where the scan starting position of a scanning light beam is indicated as 0 while the scan finishing position thereof as 1. The axis of the abscissa represents the relative reflected light amount. The graph shows a measurement that is conducted using light beams having an identical incident angle.

When the reflective faces 2 of the rotary polygon mirror 1 are made of a metal reflective surface coated with a protective film, an incident S-polarized light beam shows a greater reflectivity as its incident angle (an angle against the normal) enlarges while a P-polarized light beam shows a smaller reflectivity in the same condition. The same result is given when the reflective faces 2 consist of a metal reflective surface without coating a protective film.

Figure 7:
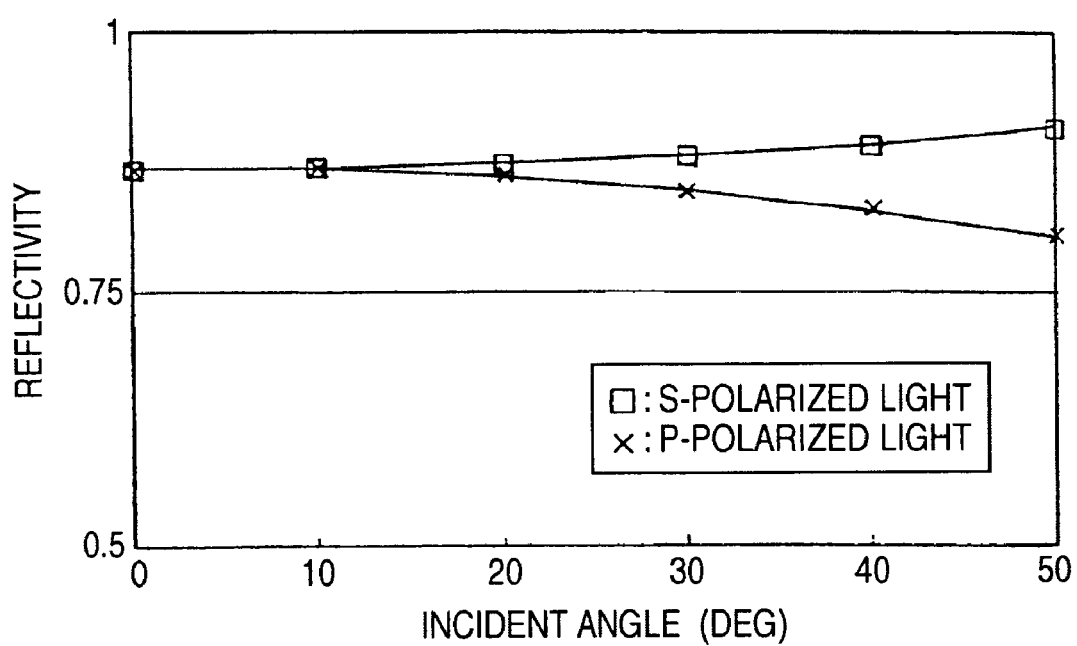
FIG. 7 is a graph for explaining variation of reflectivity of each of S-polarized light and P-polarized light in accordance with an incident angle thereof with respect to the reflective face.

In utilizing the above phenomenon, according to the invention, an incident direction of light made incident on each reflective face 2 of the rotary polygon mirror 1 is determined in accordance with the polarized direction of the light in such a way that the light is made to incident on the reflective face 2 from the upstream side or downstream side of the deflection of a reflected light beam, so that an optical power decrease at an optical beam spot at the scanning initiation side, as shown in FIG. 6, is compensated with the dependency of a reflectivity on an incident angle, as shown in FIG. 7. Specific arrangements for such compensation is shown in FIGS. 1 and 2.

Figure 1:
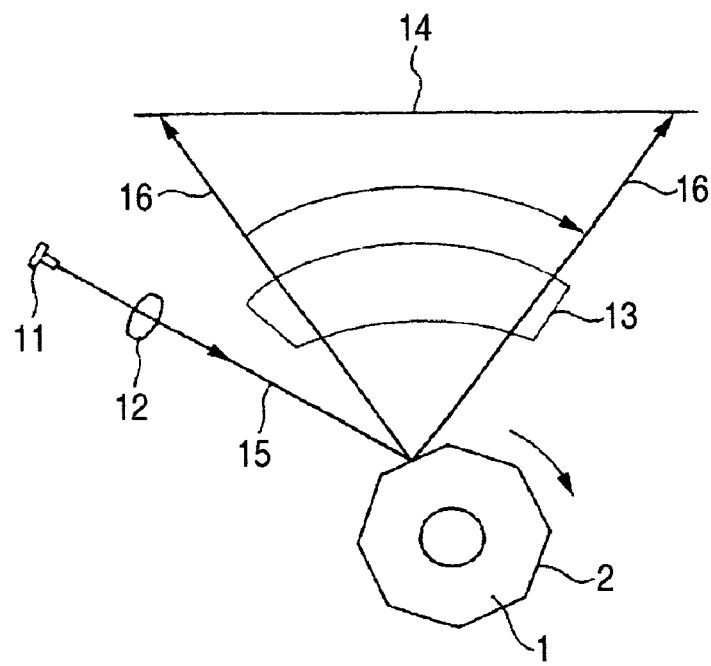
FIG. 1 is a schematic plan view showing an optical scanning device according to a first embodiment of the invention.
Figure 2:
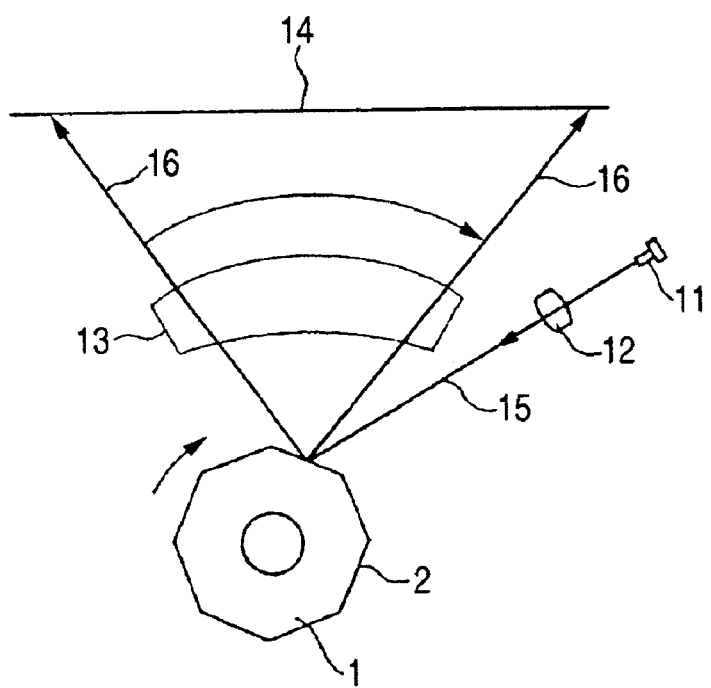
FIG. 2 is a schematic plan view showing an optical scanning device according to a second embodiment of the invention.

FIG. 1 shows an optical scanning device according to a first embodiment of the invention.

The scanning device includes a light source 11, a lighting lens 12, the rotary polygon mirror 1, a scanning optical system 13, and a scanned face (photosensitive body if the device is an electrophotography laser printer) 14. Light from the light source 11 is transformed into a parallel light beam via the lighting lens 12 (when the light is subjected to a pyramidal angle error correction, it is transformed into a parallel light beam in the direction perpendicular to the rotary axis of the rotary polygon mirror 1 while being focused in the vicinity of the reflective face 2 of the mirror 1 in the direction parallel with the axis). The parallel light beam 15 is made incident on the reflective face 2 of the rotary polygon mirror 1, where the light beam 15 is reflected and deflected to head for the scanning optical system 13. After passing through the optical system 13, the light beam 15 is transformed into a deflected light beam 16, which is deflected in the arrow direction in the Figures, and is made incident on the scanned face 14 to be converged.

In the arrangement shown in FIG. 1, the light beam 15 made incident on the reflective face 2 is P-polarized light (the oscillating direction of the electric field vector of the light beam is parallel with the incident face). The light beam 15 comes from the upstream side of the deflection of a deflected light beam 16 and is made incident on the reflective face 2, as shown in FIG. 1. This means that the light beam 15 is made incident on the reflective face 2 at a small incident angle at the initial stage of deflection, but the incident angle becomes larger as the polygon mirror 1 rotates. As a result, the light beam 15 is made incident on reflective face 2 at a large incident angle at the last stage of deflection. While a reflectivity at the reflective face 2 decreases as the incident angle of the P-polarized light beam 15 enlarges (see FIG. 7), the initial reduction of the reflectivity due to dirt on the reflective face 2 is compensated with the dependency of the reflectivity on respective incident angles, because the light beam 15 is first made incident on the leading end side 2' of the reflective face 2 in the rotation direction (see FIG. 5), where the dirt is severe and the reflectivity drops.

Figure 3:
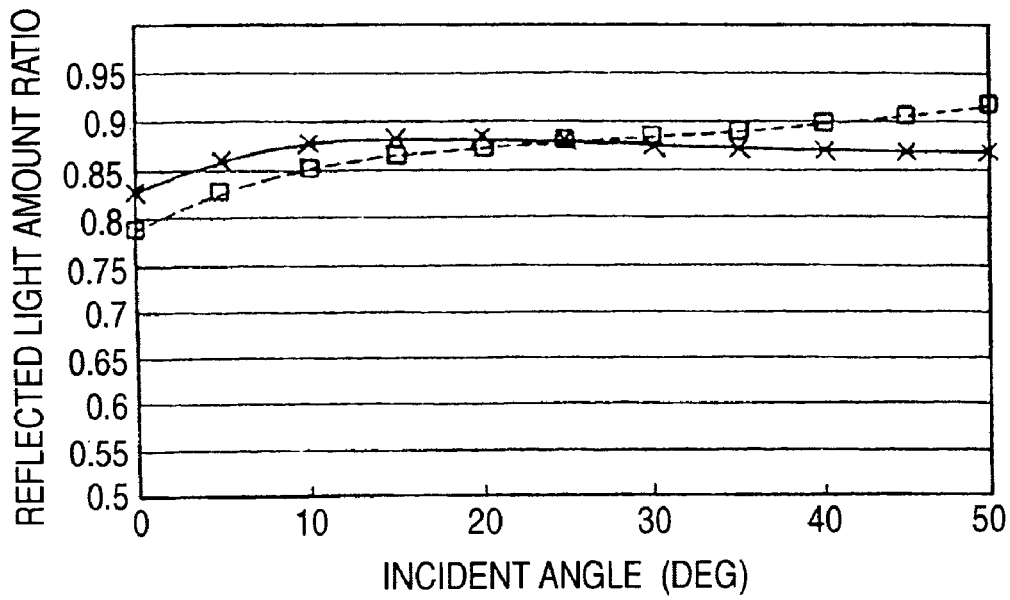
FIG. 3 is a graph for explaining variation of a reflected light amount ratio in accordance an incident angle of an optical beam shown in FIG. 1 when reflective faces of a rotary polygon mirror of FIG. 1 is dirtied.

FIG. 3 shows an example of the distribution of reflected light amount corresponding to respective incident angles of the light beam 15 at the dirtied reflective face 2 of the rotary polygon mirror 1, which is in the arrangement shown in FIG. 1. The solid line represents the distribution of reflected light amount when the light beam 15 is made incident in the direction shown in FIG. 1. On the other hand, the dashed line represents the distribution of reflected light amount when the light beam 15 is made incident in the opposite side to that shown in FIG. 1 (the downstream side of the deflection of the deflected light beam 16).

Before the reflective face 2 is dirtied, the distribution of reflected light amount on the reflective face 2 corresponds to the reflectivity curve of the P-polarized light shown in FIG. 7. When the reflective face 2 dirtied operates for a certain time, optical power at the initial stage of deflection (the scanning initiation side) decreases, so that the distribution of reflected light amount becomes more balanced as indicated in FIG. 3 in the overall primary scanning range. Thus, the non-uniformity of optical power distribution in the primary scanning direction is suppressed further. As the dashed line in FIG. 3 indicates, if the light beam 15 is made incident in the opposite side to that shown in FIG. 1, an optical power difference between both sides of the scanning range becomes excessively large to make the optical power distribution explicitly non-uniform, which causes the non-uniformity of density or color in an application for a laser printer.

FIG. 2 shows an optical scanner according to a second embodiment of the invention. In this embodiment, an S-polarized light beam 15 (the oscillating direction of the electric field vector of the light beam is perpendicular to the incident face) is made incident on the reflective face 2. The light beam 15 comes from the downstream side of the deflection of a deflected light beam 16 and is made incident on the reflective face 2, as shown in FIG. 2. This means that the light beam 15 is made incident on the reflective face 2 at a large incident angle at the initial stage of deflection, but the incident angle becomes smaller as the polygon mirror 1 rotates. As a result, the light beam 15 is made incident on reflective face 2 at a small incident angle at the last stage of deflection. While a reflectivity at the reflective face 2 decreases as the incident angle of the S-polarized light beam 15 decreases (see FIG. 7), the initial reduction of the reflectivity due to dirt on the reflective face 2 is compensated with the dependency of the reflectivity on respective incident angles, because the light beam 15 is first made incident on the leading end side 2' of the reflective face 2 in the rotation direction (see FIG. 5), where the dirt is severe and the reflectivity drops.

Figure 4:
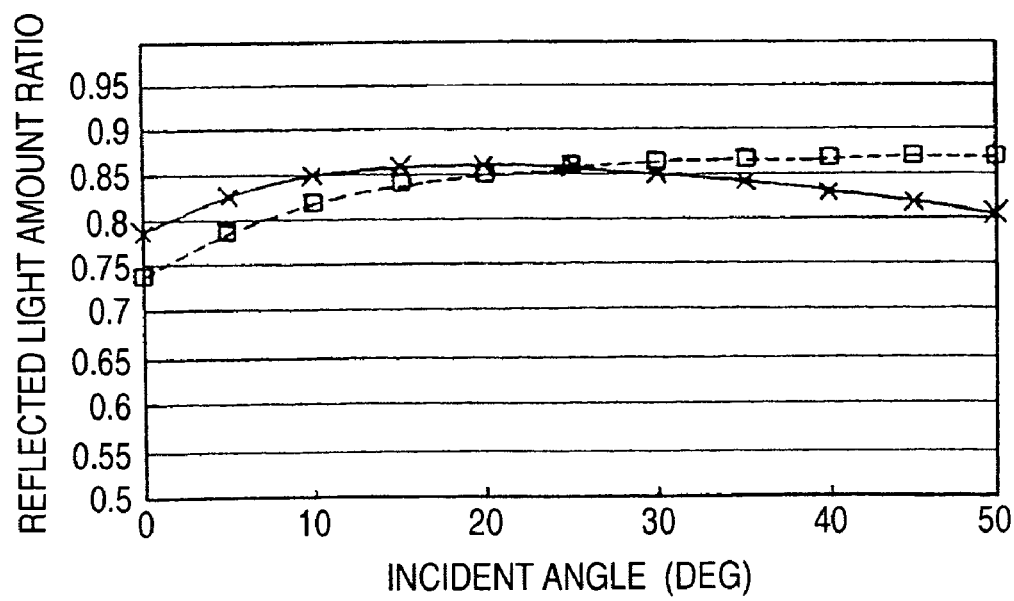
FIG. 4 is a graph for explaining variation of a reflected light amount ratio in accordance an incident angle of an optical beam shown in FIG. 2 when reflective faces of a rotary polygon mirror of FIG. 2 is dirtied.

FIG. 4 shows an example of the distribution of reflected light amount corresponding to respective incident angles of the light beam 15 at the dirtied reflective face 2 of the rotary polygon mirror 1, which is in the arrangement shown in FIG. 2. The solid line represents the distribution of reflected light amount when the light beam 15 is made incident in the direction shown in FIG. 2. On the other hand, the dashed line represents the distribution of reflected light amount when the light beam 15 is made incident in the opposite side to that shown in FIG. 2 (the upstream side of the deflection of the deflected light beam 16).

Before the reflective face 2 is dirtied, the distribution of reflected light amount on the reflective face 2 corresponds to the reflectivity curve of the S-polarized light shown in FIG. 7. When the reflective face 2 dirtied operates for a certain time, optical power at the initial stage of deflection (the scanning initiation side) decreases, so that the distribution of reflected light amount becomes more balanced as indicated in FIG. 4 in the overall primary scanning range. Thus, the non-uniformity of optical power distribution in the primary scanning direction is suppressed further. As the dashed line in FIG. 4 indicates, if the light beam 15 is made incident in the opposite side to that shown in FIG. 2, an optical power difference between both sides of the scanning range becomes excessively large to make the optical power distribution explicitly non-uniform, which causes the non-uniformity of density or color in an application for a laser printer.

The direction of the polarization (P-polarization, S-polarization) of the light beam 15, which is emitted from the light source 11 and is made incident on the reflective face 2 of the rotary polygon mirror 1, is adjusted to a desired direction. When the emitted light is a linear polarized light, the polarization is adjusted by rotation. When it is polarized light other than the linear polarized light, a polarizer is arranged in the light path to adjust the polarization of the light beam 15 to a desired polarized direction.

With the above configurations of both embodiments, the original profile of the power distribution of the incident light and the profile of the power distribution resulted from the dirtying of the reflective face are compensated for each other. As a result, images formed by an electrophotography laser printer, etc., using the optical scanning device of the invention, show less non-uniformity of density and/or color.

Figure 8:
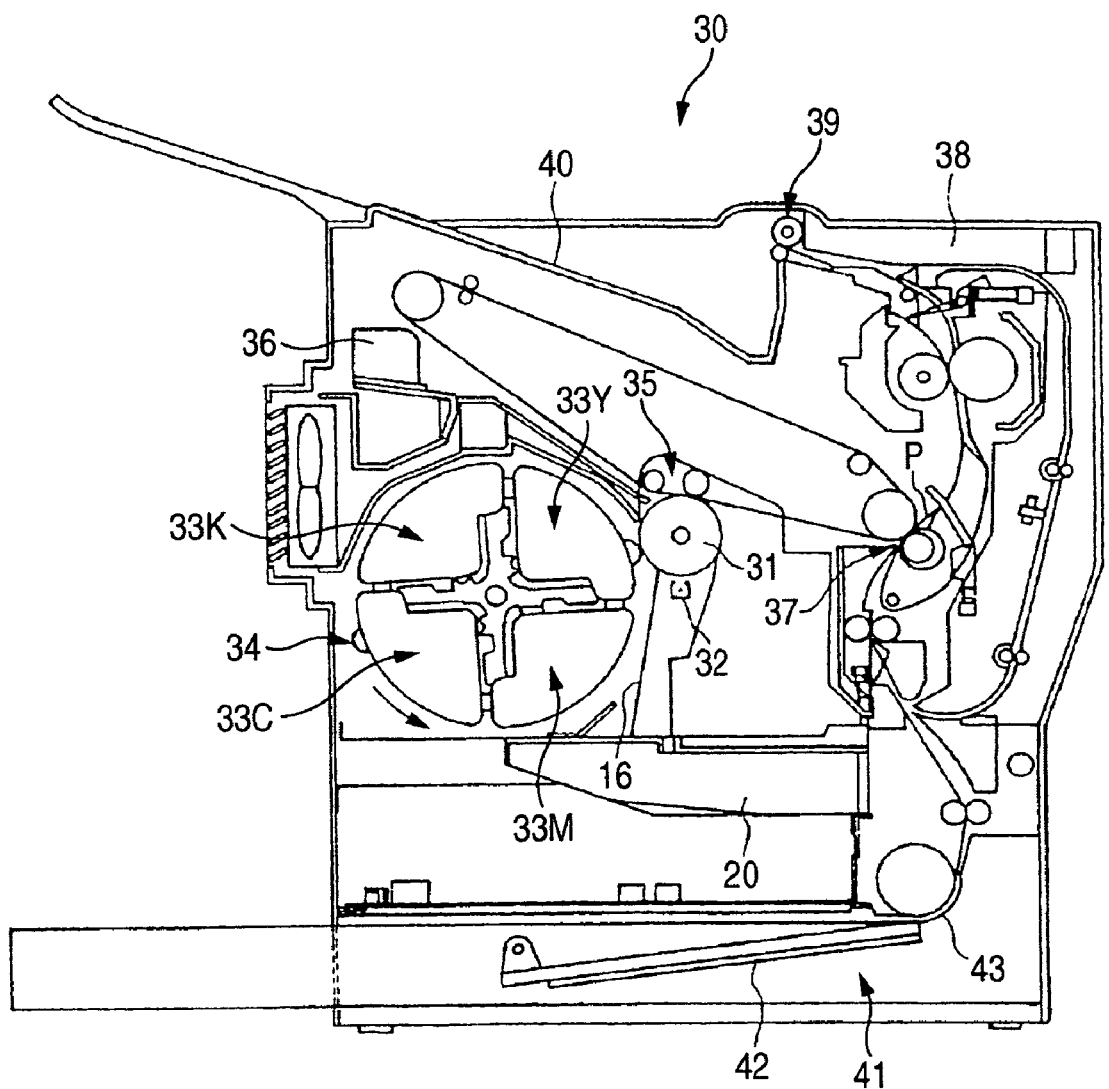
FIG. 8 is a schematic section view of an image forming apparatus incorporating the optical scanning device of the invention.

The optical scanning device, according to the invention, is particularly effective when incorporated into an image forming apparatus to be installed in an environment susceptible to dirt. FIG. 8 shows an example of an image forming apparatus 30 (electrophotography laser printer) using an electrophotography process, which is configured to incorporate the optical scanning device of the invention. The image forming apparatus 30 of the embodiment has a single image carrier (photosensitive drum) 31. The apparatus 30 further comprises: a charger 32, which is arranged on the periphery of the image carrier 31 along the upstream to downstream of the rotation direction of the image carrier 31 and provided with a single corona charging device; an optical scanning device 20 of the invention, which emits the light beam 16 repetitively deflected in an axial direction of the cylindrical image carrier (photosensitive drum) 31 to perform primary scannings; and a rotary developing device 34 consisting of an yellow developing unit 33Y, a magenta developing unit 33M, a cyan developing unit 33C, and a black developing unit 33K, which are placed around the rotation center such that one of the developing units is selectively subjected to the developing operation in accordance with the rotary action of the developing device 34.

An electrostatic latent image is formed as the image carrier 31 is charged uniformly by the charging unit 32 and is subjected to the deflected light beam 16 from the optical scanning device 20 for an exposure discharge process. The latent image is then developed into respective toner images sequentially by any one of the developing units 33Y, 33M, 33C and 33K. The developed toner images of yellow, magenta, cyan, and black are transferred sequentially to an intermediate transfer belt 36 in a primary transfer process via a primary transfer bias applied to a primary transfer member (transfer rollers) 35, and are superimposed over each other on the intermediate transfer belt 36 to form a full color toner image. The full color toner image is transferred further to a recording medium P, such as a paper sheet, via second transfer rollers 37 in a secondary transfer process, and is made to pass through a pair of fixing rollers in a fixing unit 38 to be fixed on the recording medium P. Then the recording medium P with the fixed color image is ejected onto an ejecting tray 40 set on the upper part of the image forming apparatus via a pair of ejecting rollers 39.

The symbol 41 in FIG. 8 represents a feeding unit, which has a feeding section comprising a feeding cassette 42, on which the recording media P are stacked and held, and a pick-up roller 43 that feeds the recording mediums P one by one from the cassettes 42.

In the image forming apparatus 30, the optical scanning device 20 is arranged almost under the rotary developing device 34 in the gravitational direction. This makes the scanning device 20 susceptible to contamination by the toner dropping from the developing units 33Y, 33M, 33C and 33K. As a result, the leading end side 2' of each reflective face 2 in the rotation direction becomes easy to dirty as it is described referring to FIG. 5. The optical scanning device according to the invention, therefore, is employed to replace the optical scanning device 20, which operates under such a disadvantageous environment, in order to suppress the non-uniformity of density or color of images even after the image forming apparatus 30 operates for a sufficient time.

The description of the optical scanning device and the image forming apparatus using the same, which is hitherto given according to the principle and embodiments of the devices, does not limit the true scope of the invention, and various modifications of the embodiments are possible.

What is claimed is:

1. A method of determining an arrangement of an optical scanning device provided with a rotary polygon mirror rotating in a downstream direction and having a plurality of reflective faces, the method comprising steps of:

selecting either predominantly S-polarized light or predominantly P-polarized light as light to be received on one of the reflective faces and to be reflected and deflected along a deflection trajectory in accordance with a rotary action of the polygon mirror; and positioning a photo emitter, which emits the light, such that if the predominantly S-polarized light is selected, the light is received on the one of the reflective faces from a location in the downstream direction relative to the deflection trajectory, and, if the predominantly P-polarized light is selected, the light is received on the one of the reflective faces from a location in an upstream direction relative to the deflection trajectory, wherein the upstream direction is opposite to the downstream direction.

2. An optical scanning device, comprising:

a photo emitter, which emits light; and a rotary polygon mirror rotating in a downstream direction and having a plurality of reflective faces, the mirror adapted to reflect the light received from the photo emitter on one of the reflective faces along a deflection trajectory in accordance with a rotary action thereof, wherein the photo emitter and the rotary polygon mirror are arranged such that only predominantly S-polarized light is received from the photo emitter on the one of the reflective faces, and the predominantly S-polarized light is received from a location in the downstream direction from the deflection trajectory.

3. An image forming apparatus incorporating the optical scanning device as set forth in claim 2, comprising:

a photosensitive member, adapted such that a latent image is formed thereon by being scanned with the light deflected by the optical scanning device; and a developing device, which applies developer on the photosensitive member to make the latent image visible.

4. The image forming apparatus as set forth in claim 3, wherein the optical scanning device is arranged below the developing device.

5. An optical scanning device, comprising:

a photo emitter, which emits light; and a rotary polygon mirror rotating in a downstream direction and having a plurality of reflective faces, the mirror adapted to reflect the light received from the photo emitter on one of the reflective faces along a deflection trajectory in accordance with a rotary action thereof, wherein the photo emitter and the rotary polygon mirror are arranged such that only predominantly P-polarized light is received from the photo emitter on the one of the reflective faces, and the predominantly P-polarized light is received from a location in an upstream direction from the deflection trajectory, wherein the upstream direction is opposite to the downstream direction.

6. An image forming apparatus incorporating the optical scanning device as set forth in claim 5, comprising:

a photosensitive member, adapted such that a latent image is formed thereon by being scanned with the light deflected by the optical scanning device; and a developing device, which applies developer on the photosensitive member to make the latent image visible.

7. The image forming apparatus as set forth in claim 6, wherein the optical scanning device is arranged below the developing device.

8. A method of determining an arrangement of an optical scanning device provided with a rotary polygon mirror rotating in a downstream direction and having a plurality of reflective faces, the method comprising:

selecting either predominantly S-polarized light or predominantly P-polarized light as light which is to be made incident on one of the reflective faces and to be reflected and deflected in accordance with a rotary action of the polygon mirror; and positioning a photoemitter, which emits the light, such that the light is incident on the one of the reflective faces and, as the mirror rotates in the downstream direction, an angle of incidence of the light on the one of the reflective faces decreases if the predominantly S-polarized light is selected and increases if the predominantly P-polarized light is selected.

* * * * *